Patented Apr. 14, 1931

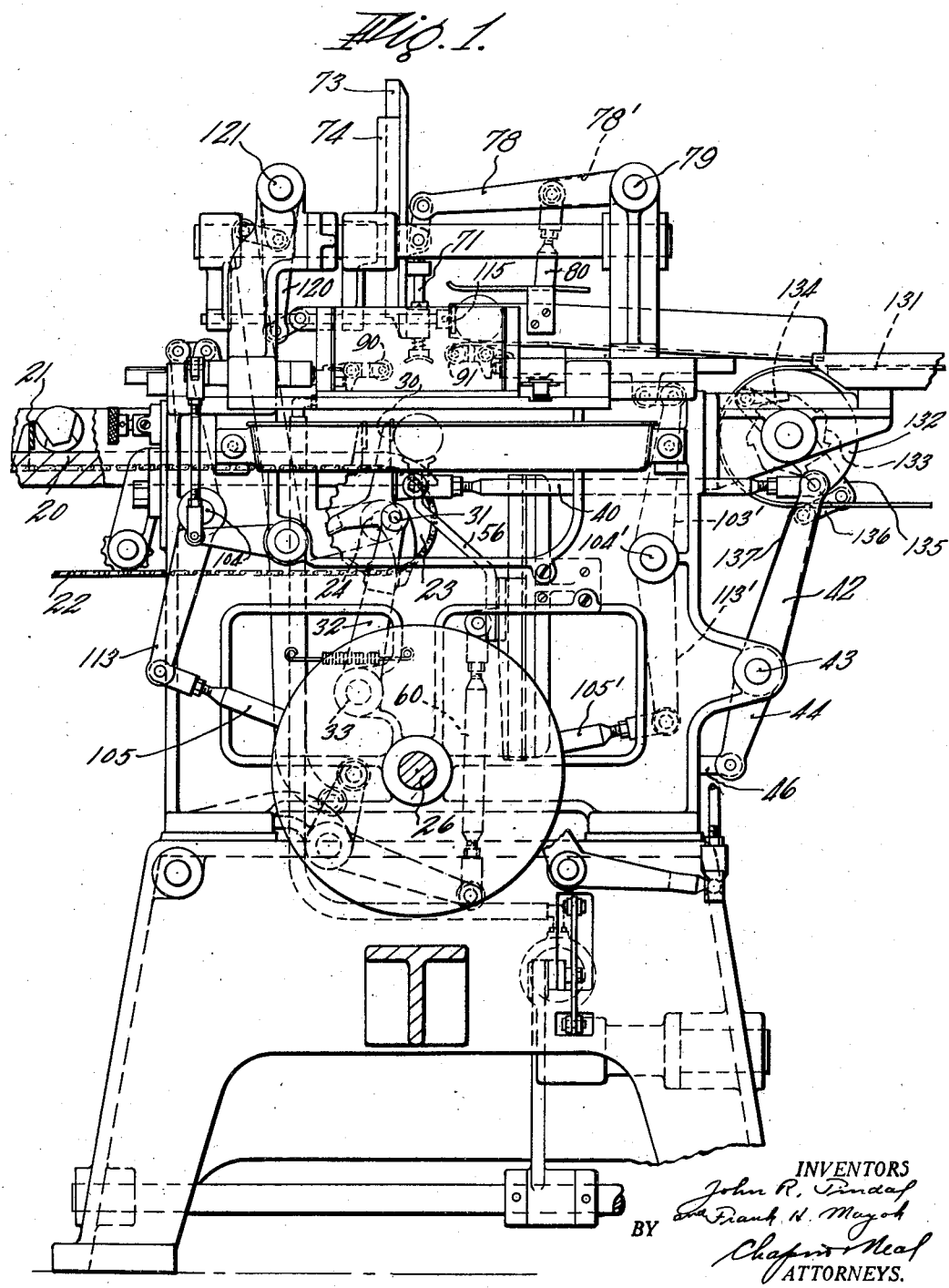

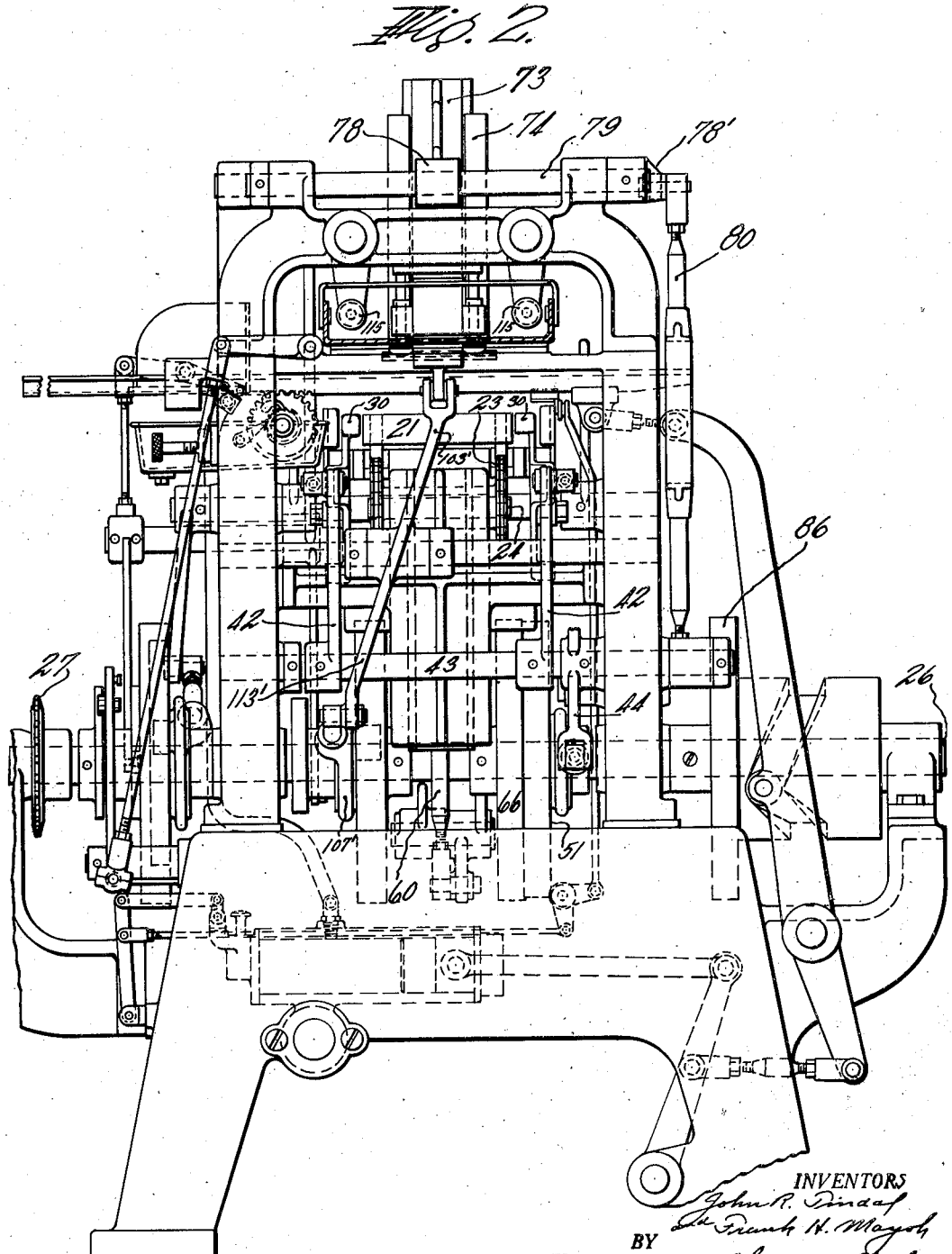

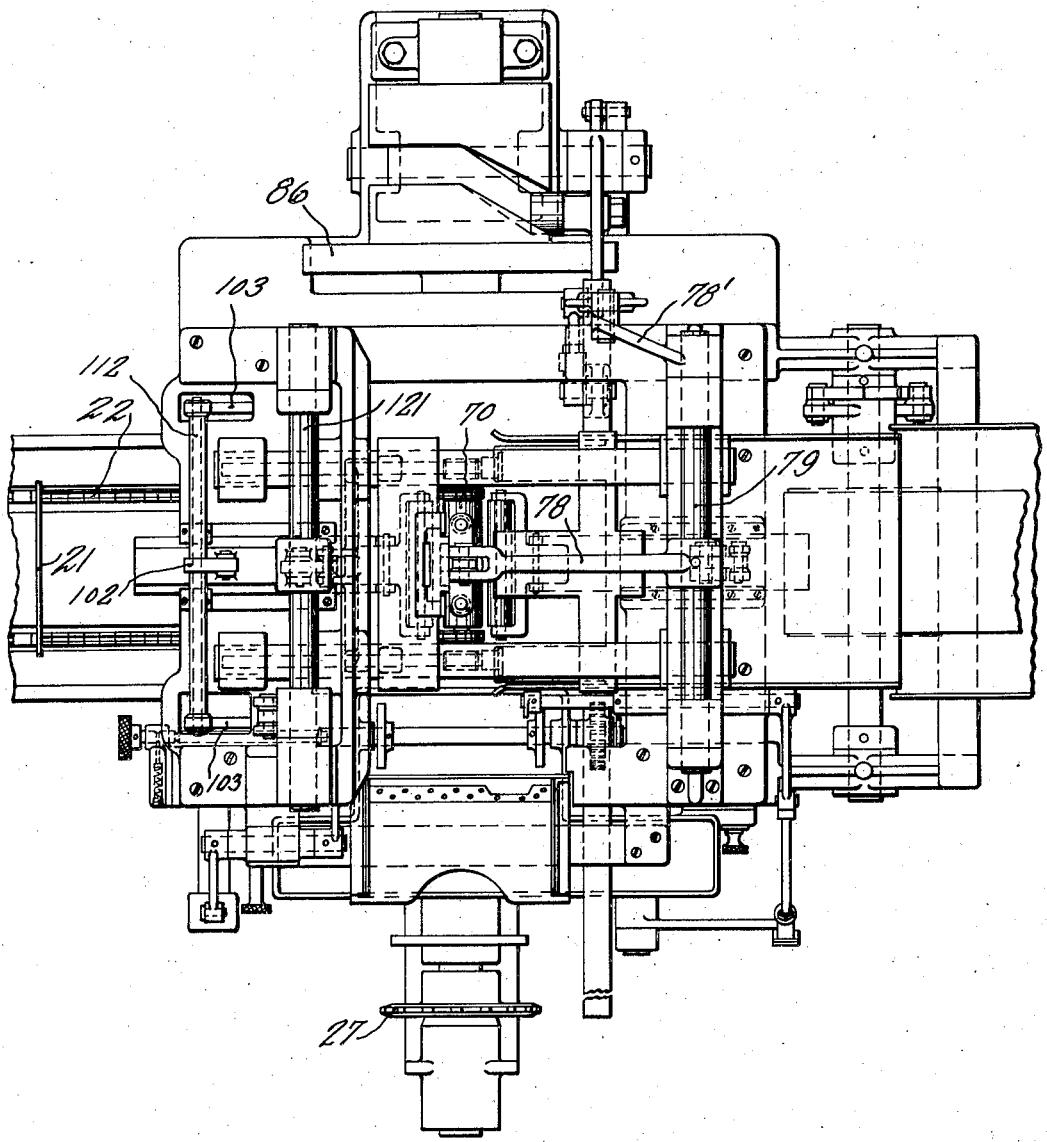

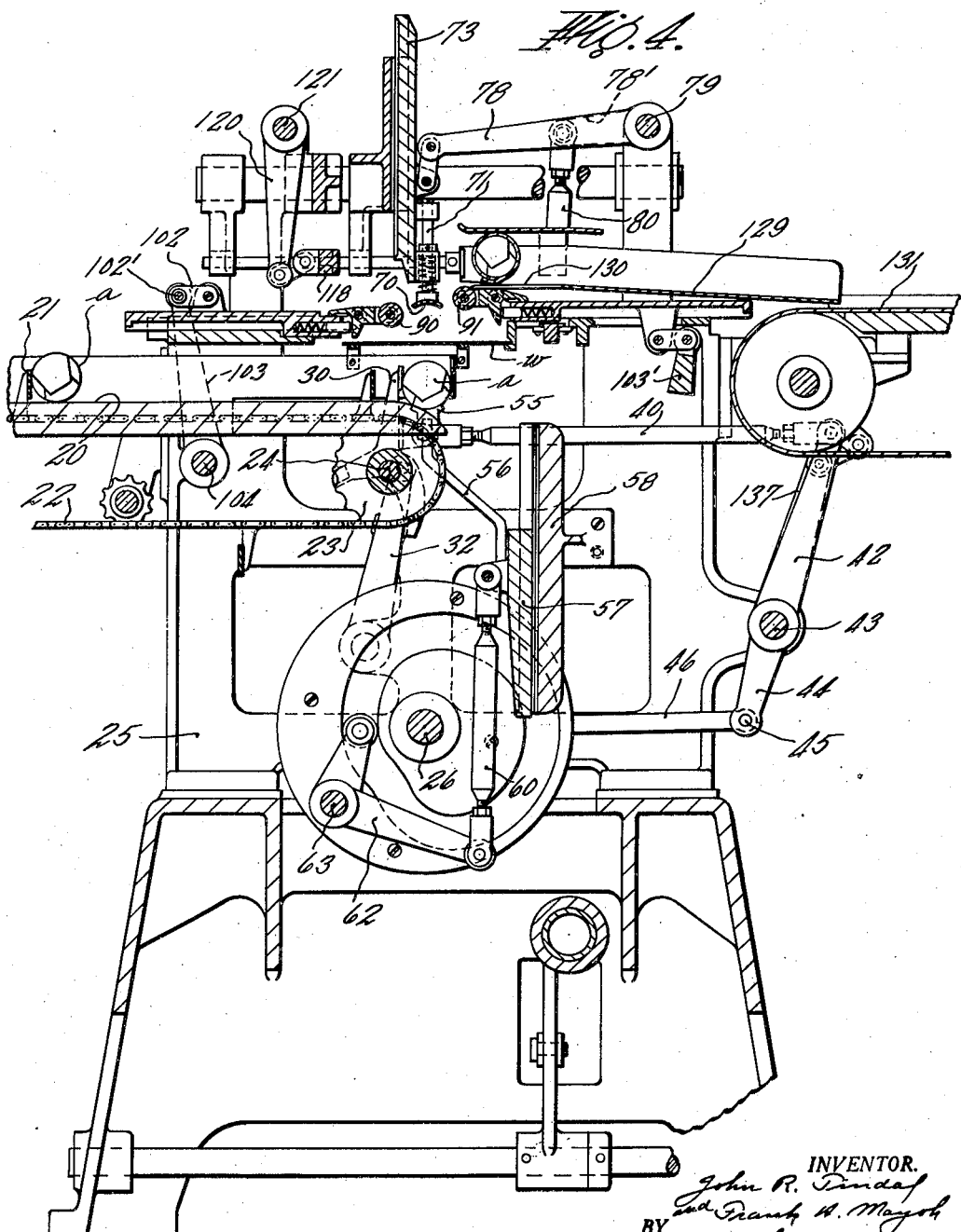

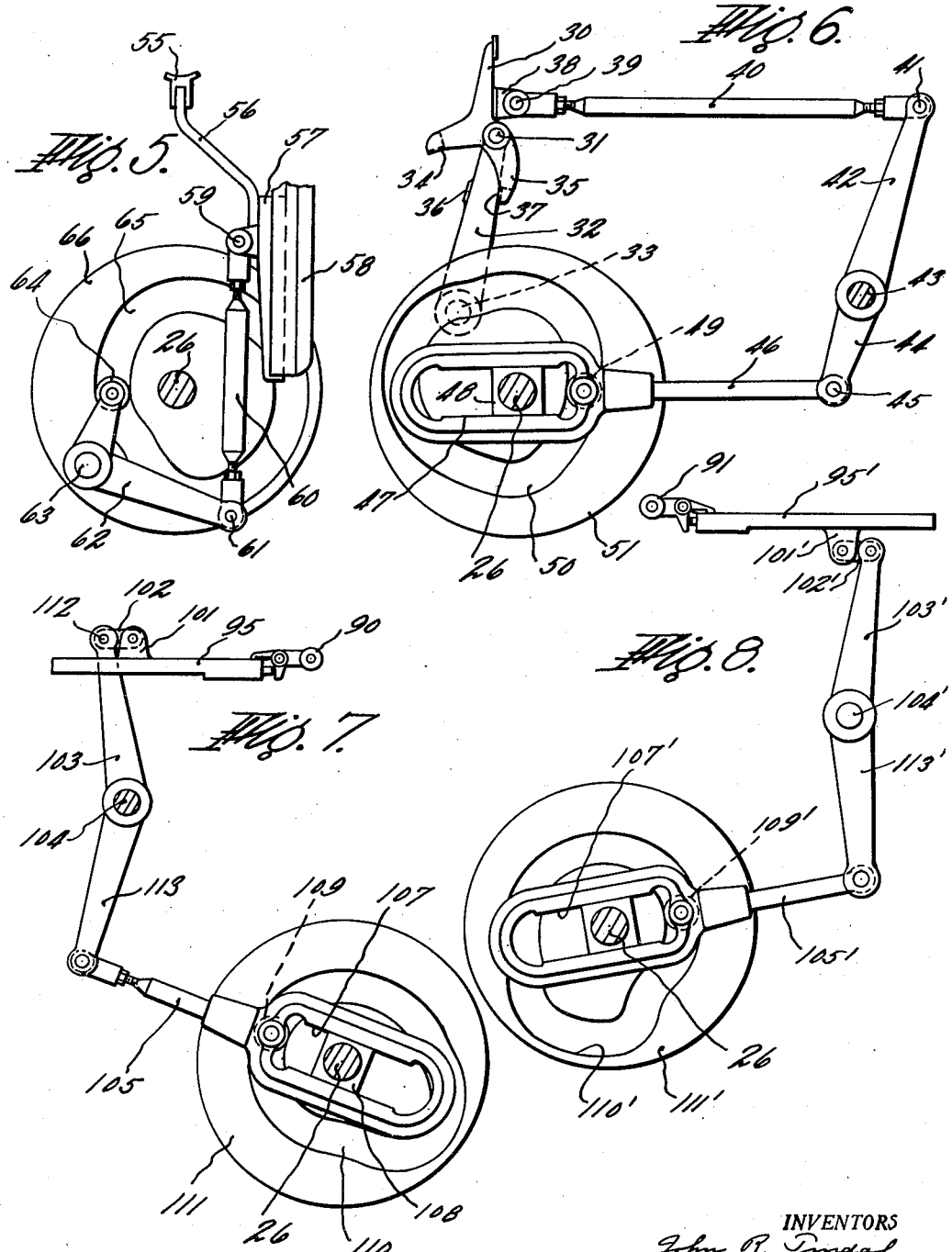

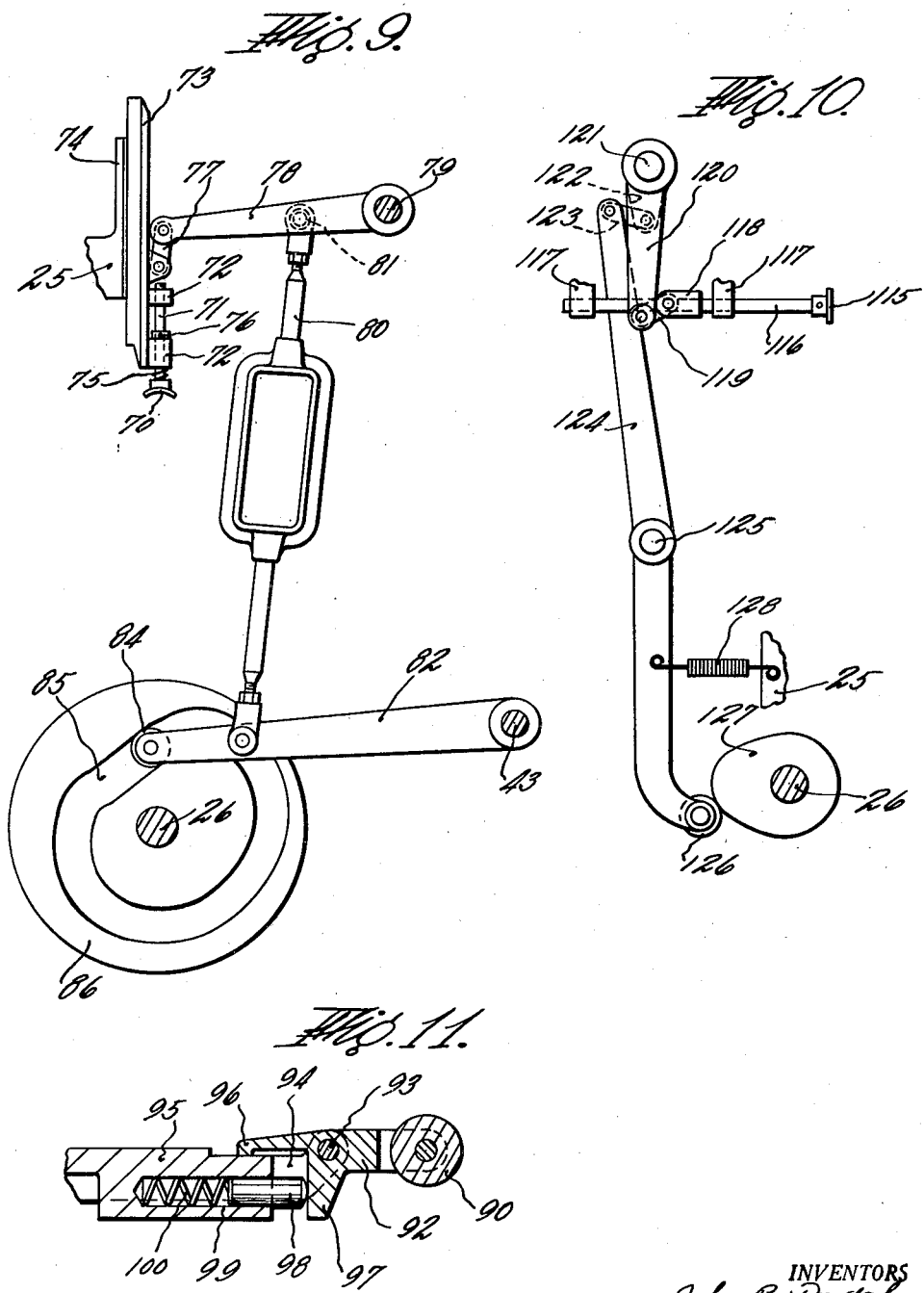

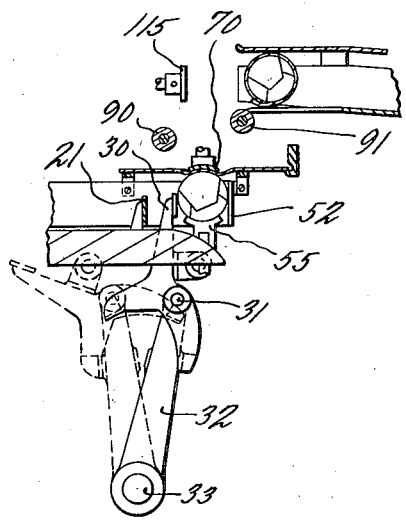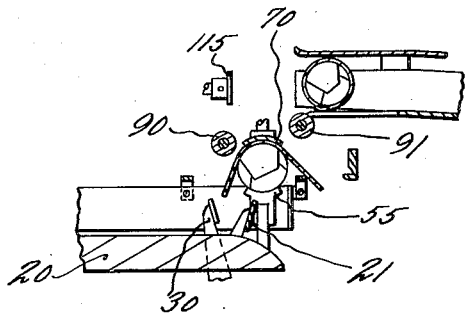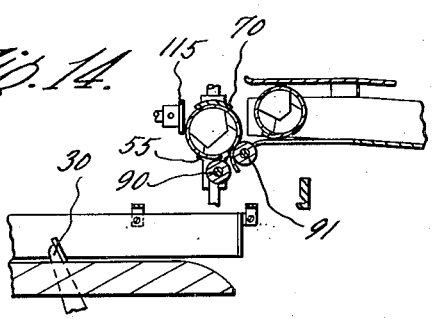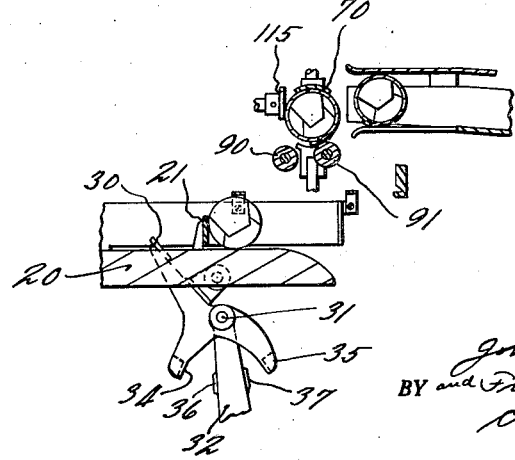

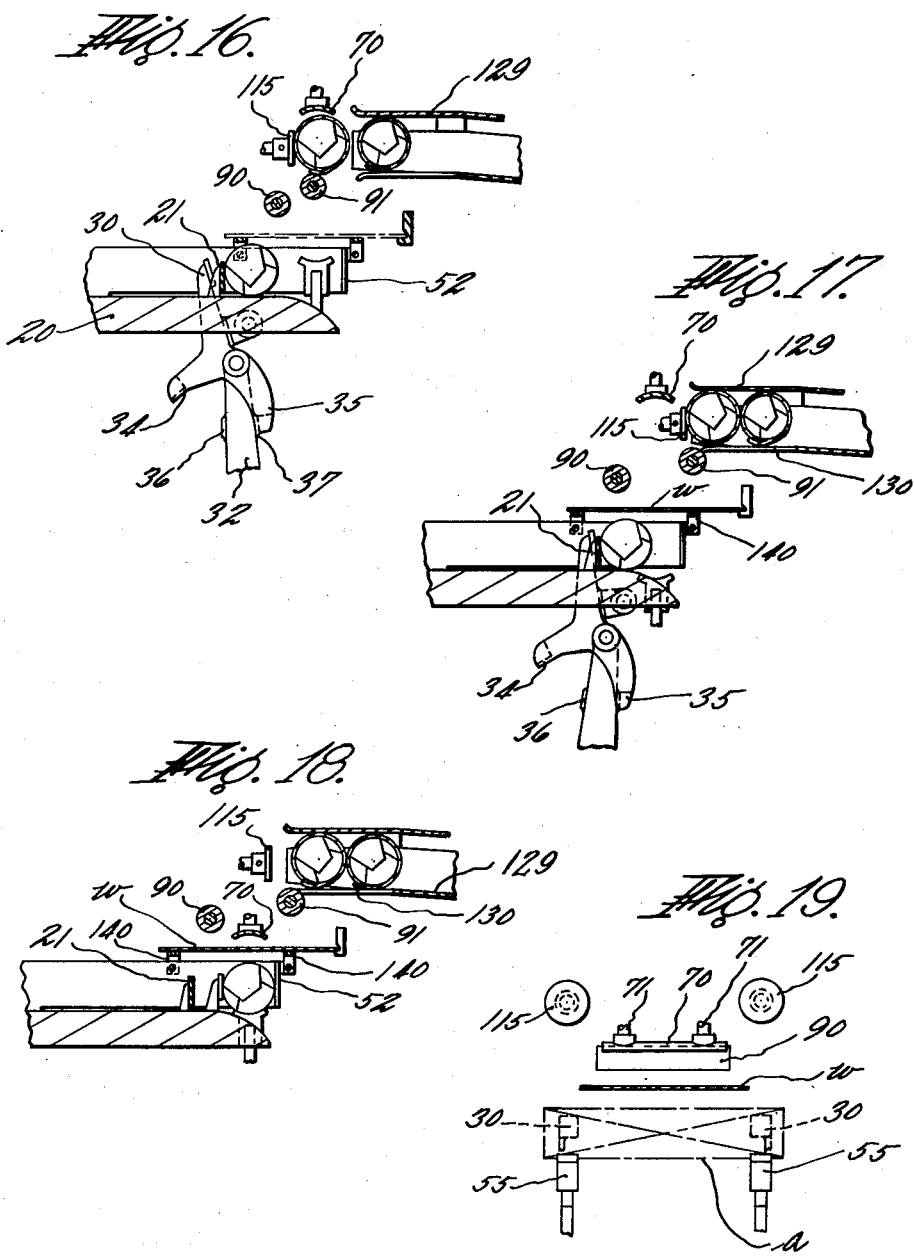

1,800,485

UNITED STATES PATENT OFFICE

JOHN R. TINDAL, OF WEST SPRINGFIELD, AND FRANK H. MAYOH, OF SPRINGFIELD, MASSACHUSETTS, ASSIGNORS TO PACKAGE MACHINERY CO., OF SPRINGFIELD, MASSACHUSETTS, A CORPORATION OF MASSACHUSETTS

LABELING MACHINE

Application filed February 11, 1929. Serial No. 339,003.

This invention relates to an apparatus for placing bands or labels around articles such as wrapped packages of crackers. One object of the invention is to provide mechanism which will operate rapidly and simply to apply a band or label to an article of this character. A further object is to provide a mechanism adapted to receive articles in succession from a moving series of pushers and to remove the articles therefrom without disturbing the continuous movement of the pushers. A further object is to provide banding mechanism of very compact design. Other objects will appear from the following description and claims.

Referring to the drawings:

Fig. 1 is a side elevation of a labeling machine embodying our invention;

Fig. 2 is an end elevation thereof;

Fig. 3 is a top plan view thereof;

Fig. 4 is an elevational section taken longitudinally through the center of the machine;

Fig. 5 is a detail showing the mechanism for operating a package lifter;

Fig. 6 is a detail showing the mechanism for moving the packages ahead of the conveyer flights and onto the package lifter;

Fig. 7 is a detail showing the mechanism for operating one label folding roll;

Fig. 8 is a detail showing the mechanism for operating the other label folding roll;

Fig. 9 is a detail showing the mechanism for operating the upper article supporting plunger;

Fig. 10 is a detail showing the mechanism for ejecting the labeled package;

Fig. 11 is a detail section showing the mounting of the label applying rolls;

Figs. 12 to 18 are details illustrating progressively the operation of the machine; and Fig. 19 is a diagrammatic cross-section showing the relative lateral positions of the various article handling devices.

*Article feed.*—The packages *a* to be labeled are carried over a table 20 by a series of pushers 21 mounted on parallel conveyer chains 22. At one end these conveyer chains pass around sprockets 23 mounted upon an idle shaft 24 journaled in the frame 25 of the labeling machine. The other ends of the chains may pass around sprockets on a driven shaft mounted on a wrapping machine which prepares the packages for labeling or may be otherwise driven. The working parts of the labeling machine are driven in timed relation to the pushers 21 and, therefore, in the former case to the wrapping machine from a shaft 26 journaled in the frame 25 and bearing at one end (Fig. 2) a sprocket 27 joined to a sprocket on the wrapping machine by a chain (not shown).

Referring to Fig. 4, it will be seen that the packages *a* are carried along the table 20 in spaced relation by the pushers 21. These pushers move continuously, and in order to allow the package to be lifted clear of the pushers without interference each package is, at a position just short of the end of table 20, given an accelerated forward movement serving to space it from the pusher which up to that point had been moving it. This motion is given by a pair of arms 30 which, as will appear in Figs. 2 and 19, engage the packages near their ends, out of range of the pushers 21.

Each arm 30 is pivoted at 31 (Figs. 1 and 6) to a lever 32 pivoted to the frame 25 at 33. Extending from each of the arms is a pair of projections 34 and 35 which are positioned to strike respectively against abutments 36 and 37 formed on the levers 32. Also extending from each arm 30 is a lug 38 pivoted at 39 to a link 40 preferably made in the form of a turnbuckle for purposes of ready adjustment. Each link is pivoted at 41 to an arm 42 fast upon a rocking shaft 43 journaled in the frame 25. Likewise fast upon this shaft is an arm 44 pivoted at 45 to one end of a connecting rod 46 formed at its other end with a guideway 47 sliding upon a block 48 rotatably mounted upon the shaft 26. A cam roll 49, secured to the connecting rod, runs in a groove 50 in a face cam 51 fast on the main shaft 26 to give timed movement to the various parts of the linkage.

It will be observed that if the cam operates to push links 40 to the left in Fig. 6, the arms 30 will be rocked on their pivots until the projections 34 hit abutments 36, before any motion of levers 32 takes place. This preliminary movement rotates the arms to a position below the table. Further motion of the links will move the arms and levers to the dotted line position of Fig. 12, when they are ready to start their package shifting movement. As the links now start to move to the right, the arms 30 will be swung on their pivots to project them above the surface of the table 20 (Figs. 15 and 16). When projection 35 strikes abutment 37 the levers 32 also begin to move, and the arms are carried bodily to the right (Fig. 17). Since the cam is so proportioned that this bodily movement of the arms is faster than the continuous rate of travel of the pushers 21, the package will, as shown in Figs. 12 and 18, be moved ahead of its pusher to a position against a stop plate 52.

*Article lifting mechanism.*—After being positioned against the stop plate 52 as described, the package is grasped between a centrally located upper plunger and a pair of lower lifters spaced apart a distance greater than the width of the label to be applied. The lower lifters 55 are, as best shown in Fig. 5, carried on arms 56 mounted upon a slide 57 reciprocable in ways 58 secured to the main frame 25. Pivoted at 59 to the slide is a connecting rod 60, preferably formed as a turnbuckle to facilitate adjustment, and pivoted at 61 to one arm of a bell crank 62 free to swing on a shaft 63 mounted in the frame. A cam roll 64 carried by the other arm of the bell crank runs in a groove 65 formed in the side of a cam disk 66 secured upon the main cam shaft 26. The lifters 55 are raised and lowered once during each revolution of the shaft.

Moving generally in synchronism with the lifters 55 is an upper plunger 70, secured as shown in Fig. 19 to rods 71. These rods slide in guides 72 (Fig. 9) projecting from a slide 73 reciprocable in ways 74 supported from the machine frame. Springs 75 are compressed between the plunger and the lower guides 72, giving a yielding connection between the slide and the plunger, and collars 76 are secured to the rods to determine their lower limit of motion. A link 77 is pivoted to the slide and to a lever 78 secured to an oscillatable shaft 79. A connecting rod 80, formed as in the other cases as a turnbuckle and having its central portion branched to avoid other parts of the machine, is pivoted at 81 to a lever 78' also secured to the shaft 79. At its lower end this connecting rod is pivoted to a lever 82 freely rotatable on the shaft 43 and bearing at its free end a roll 84 running in the groove 85 of a cam 86 fast upon shaft 26.

In operation, a label w, having been gummed along one edge and fed into position above the article by any standard or desirable mechanism (Fig. 18), the lifters and the upper plunger grasp the article and label between them at their lower limit of travel, as shown in Fig. 12, the package being tightly but yieldingly gripped by reason of the spring mounting of the upper plunger. The lifters and the plunger then ascend together, carrying the package with a continuous motion past the folding rollers (Figs. 13 and 14) to the upper limit of motion shown in Fig. 15. The travel of the upper plunger is somewhat greater than that of the lifters, and leaves the package at the latter's upper limit of motion, leaving the package supported by one of the folding rolls, as will appear, and free to be moved into the delivery chute by the ejector. The lifters start their downward movement before the upper plunger, so that they pass below the level of table 20 in time to receive the next package to be placed upon them by the arms 30.

*Label folding rollers.*—The label is folded under the package, as will be described later, by two successively acting rollers 90 and 91, the mounting and operating mechanism for which will be described with reference to Figs. 7, 8, and 11. The mounting of the two rollers is identical and will only be described for roller 90. Each roller is journaled freely upon an arm 92 (Fig. 11) pivoted at 93 to a forked lug 94 extending from a slide 95. A stop arm 96, integral with arm 92, extends over the slide to limit the upward movement of the roll. A projection 97, also integral with arm 92, bears against a plug 98 freely slidable in a hole 99 in the slide and backed up by a spring 100. By this construction each roll is given a yielding mounting permitting it to conform to slightly varying sizes of packages and also permitting the roll 91 to exert a lifting action upon the package in a manner which will appear when the operation of the machine is considered as a unit.

The driving mechanism for the lower roll is shown in Fig. 7. A lug 101 on the slide 95 is connected by a link 102 and a rod 112 with levers 103 pivoted at 104 to the machine frame, and having a lower extension 113 joined to a connecting rod 105. This rod is formed with a slide 107 running over a block 108 freely pivoted on shaft 26, and bears a cam roll 109 fitting in a groove 110 cut in the side of a cam 111 also mounted on this shaft. The operating parts for the other folding roll are generally similar, and have been indicated in primed characters in Fig. 8.

*Ejector.*—After the package has been raised by the lifters and the label folded around it by the rollers, it is released by the further ascent of the upper plunger, and is then ejected from the machine. Ejection is accomplished by a pair of plungers 115 which are, as shown in Fig. 19, spaced further apart than the width of the upper plunger 70 in order to permit descent of the plunger while the ejector is in its forward position (Fig. 18). Referring now to Fig. 10, each plunger 115 is mounted on a rod 116 reciprocable in guides 117 on the frame. A block 118 is secured to the two rods, and is connected by a link 119 with an arm 120 secured to a rocking shaft 121. Also secured to this shaft is a second arm 122, connected by a link 123 with one arm of a lever 124 pivoted at 125 to the frame. The other arm of this lever bears a cam roll 126 engaging the surface of a cam 127 carried on the main cam shaft 26. A spring 128 urges the lever in a direction to keep the roll pressed against the cam surface.

At the proper time in the operation of the machine the plungers 115 are moved forwardly, as shown in Figs. 16 and 17, carrying the package off from the folding roll 91 and positioning it within a delivery chute 129 of any suitable design. This chute is preferably cut away at 130 to permit the roll 91 to operate without interference. The chute is arranged to deposit the labeled packages upon a belt 131 (Fig. 1) by which they are conveyed to any desired point. This belt passes around a pulley 132 to which is attached a ratchet 133 engaged by a pawl 134 mounted on the usual pawl carrier 135. The carrier is joined by a link 136 with an arm 137 fixed to the shaft 43 previously referred to. By this means the belt is advanced intermittently during the operation of the machine to carry away the labeled packages.

*General operation.*—The general operation of the machine will now be considered with special reference to Figs. 12 to 18. In Fig. 16 a package is shown as being advanced along the table 20 by one of the continuously moving pushers 21. In Fig. 17 the arms 30 are just catching up with the package, and in Fig. 18 they have carried the package beyond the pusher to a point against the stop plate 52. During this period a label w has been deposited upon guides 140 by any suitable label feeding mechanism, the edges of the label being provided with stripes of adhesive running parallel to the length of the package and positioned upon the lower surface of the label.

As the package reaches its position against the stop plate the upper plunger 70 descends, clamping the label firmly between it and the package, as shown in Fig. 12. The lifters 55 and the plunger 70 then ascend, raising the package with sufficient rapidity to get it clear of the continuously advancing pusher 21 (Fig. 13). It will be remembered that the lateral widths and positions of the parts are such that the pushers 21 pass between the arms 30 and between the lifters 55 without interference. Further lifting of the package positions it for the action of the left-hand folding roll 90.

The rolls 90 and 91 are controlled by mechanism tending to give them a horizontal straight line movement, but their spring mounting causes the rolls to follow snugly around the curved surface of the package. The roll 90 has merely a folding function, carrying the left-hand side of the label under the package and adherently securing it in place. The other roll 91, however, not only folds the label under the package but assumes the package-lifting and sustaining functions previously performed by the lifters 55. The roll 91 starts its movement while the roll 90 is still underneath the package, and follows it in its retreat as closely as may be without causing the adhesive coated edge of the paper to smear over the retreating roll. It will be observed from a comparison of Figs. 14 and 15 that as the roll 91 approaches its position under the package it is lowered against the tension of its supporting spring 100, so that the package is gripped between the roll and the plunger 70. Sideways support is given to the package by the ejectors 115 during this period.

As soon as the pacakage is well supported by the roll 91 the lifters 55 descend to get into position for the reception of the succeeding package. Fig. 16 shows an intermediate stage where the ejectors have just started to act and the lifters 55 are still being lowered. The only remaining operations are the completion of the ejection and the retraction of the roll 91, as shown in Fig. 17.

What we claim is:

1. In a wrapping or labeling machine, a continuously moving series of pushers, means for advancing the articles successively beyond their respective pushers, mechanism for applying covering material to the articles, and means for raising the advanced articles and positioning them in operative relation to said mechanism with sufficient speed to cause the articles to clear the advancing pushers.

2. In a wrapping or labeling machine, a continuously moving series of pushers, an arm movable into and out of the path of the articles carried by the pushers and movable in the direction of movement of the pushers but at a higher speed for advancing the articles successively beyond their respective pushers, mechanism for applying covering material to the articles, and means for raising the advanced articles and positioning them in operative relation to said mechanism with sufficient speed to cause the articles to clear the advancing pushers.

3. In a wrapping or labeling machine, upper and lower members for grasping an article with a wrapper associated therewith, a pair of folders, and operating means for moving the recited elements so that the upper and lower members are first raised, the folders are successively passed under the article, and the lower member is lowered in synchronism with the advance of the second folder so that the second folder is caused to assume the support of the article.

4. In a wrapping or labeling machine, upper and lower members for grasping an article with a wrapper associated therewith, a pair of folders, an ejector, and operating means for moving the recited elements so that the upper and lower members are first raised, the folders are successively passed under the article, the lower member lowered in synchronism with the advance of the second folder so that the second folder is caused to assume the support of the article, and the ejector is moved to remove the article from the second folder.

5. In a wrapping or labeling machine, upper and lower members for grasping an article, the upper member being spring pressed downwardly, a pair of folders separately spring pressed upwardly, an ejector, and operating means for moving the recited elements so that the upper and lower members are first raised, the folders are successively passed under the article while it is held by the members, whereby the folders are placed under spring pressure, the lower member is lowered in synchronism with the advance of the second folder so that the second folder is caused to assume the support of the article, the upper member is raised to relieve the spring clamping pressure of the upper member and the second folder on the article, and the ejector is moved to remove the article from the second folder.

6. In a wrapping or labeling machine, a pair of article runways one at a higher level than the other, a series of pushers continuously moving along the lower runway to carry a succession of articles along it, upper and lower members vertically movable in the space between the runways, a pair of folders horizontally movable across the space between the runways, means for moving articles in the lower runway ahead of their respective continuously moving pushers and onto the lower member, an ejector positioned opposite the upper runway, and operating means for moving the recited elements so that the upper member descends upon an article thus positioned on the lower member, the upper and lower members are raised to carry the article out of the range of the continuously moving pushers and into the range of operation of the folders, the folders are successively passed under the raised article, the lower member is lowered in synchronism with the advance of the second folder so that the second folder is caused to assume the support of the article, and the ejector is moved to remove the article from the second folder.

7. In a wrapping or labeling machine, means for elevating an article and a superposed wrapper, folding means located at different levels along the path of elevation of the article, and means for moving the folding means successively under the article as the article is elevated opposite them.

8. In a wrapping or labeling machine, means for moving an article and a wrapper in a straight line path, folding means disposed at different points along the path and on opposite sides thereof to start the folding of the wrapper around the article, and means for moving the folding means into the path as the article passes by them to carry the wrapper around the article.

9. In a wrapping or labeling machine for cylindrical articles, means for moving an article and a wrapper in a direction transverse to the axis of the article, folding rolls disposed at different points along the path and on opposite sides thereof to start the folding of the wrapper around the article, and means for moving the folding rolls into the path as the article passes by them to carry the wrapper smoothly around the article.

10. In a wrapping or labeling machine for cylindrical articles, means for moving an article and a wrapper in a direction transverse to the axis of the article, folding rolls disposed at different points along the path and on opposite sides thereof to start the folding of the wrapper around the article, yielding mountings for the rolls, and means for moving the rolls in straight lines into the path as the article passes by them to carry the wrapper smoothly around the article, the yielding mounting of the rolls permitting them to conform to the cylindrical shape of the article.

11. In a wrapping or labeling machine, a continuously moving series of article pushers, means for applying covering material successively to a series of articles, and mechanism operative to move successive articles first in the line of travel of the pushers but at a higher speed and then transversely of the line of travel of the pushers to transfer the articles to the covering means.

12. In a wrapping or labeling machine for cylindrical articles, devices engageable with the central portion of an article for delivering it to the machine, spaced devices engaging the article near its ends for removing it from the delivering devices, a member engaging the central portion of the removed article and operable to clamp wrapping material between it and the article, and means for folding said material around the article between said spaced devices.

13. In a wrapping or labeling machine, supports spaced apart along the length of an article a distance greater than the width of the label to be applied, a presser engageable with the article on the opposite side thereof from said supports to hold a label against the article, and folders movable between the spaced supports to carry the so held label substantially completely around the article while the article is still held by the supports.

In testimony whereof we have affixed our signatures.

JOHN R. TINDAL.
FRANK H. MAYOH.